United States Patent [19]

Kumar et al.

[11] Patent Number: 5,708,560

[45] Date of Patent: Jan. 13, 1998

[54] SELECTIVELY ATTACHABLE KEYBOARD BRACKET AND LOCKABLE HOLDER FOR A HANDHELD COMPUTER

[75] Inventors: Rajendra Kumar, Akron; Steven E. Brooks, Canton Township, both of Ohio

[73] Assignee: Khyber Technologies Corporation, Fairlawn, Ohio

[21] Appl. No.: 506,095

[22] Filed: Jul. 24, 1995

[51] Int. Cl.$^6$ .............................. G06F 1/16; H05K 7/16; E05D 11/10

[52] U.S. Cl. ................ 361/680; 361/681; 248/918; 248/279.1; 248/442.2; 16/367; 16/368; 16/371; 16/352

[58] Field of Search ............... 312/223.2; 400/682, 400/489, 691–693; 345/168, 905; 248/917–923, 279.1, 442.2; 364/708.1; 16/366, 367, 368, 371, 352; 361/680–683, 686

[56] References Cited

U.S. PATENT DOCUMENTS

| | | | |
|---|---|---|---|
| 289,180 | 11/1883 | Tregurtha | 248/279.1 |
| 4,544,301 | 10/1985 | Lake, Jr. et al. | 403/300 |
| 5,241,303 | 8/1993 | Register et al. | 345/168 |
| 5,268,816 | 12/1993 | Abell, Jr. et al. | 361/681 |
| 5,268,817 | 12/1993 | Miyagawa et al. | 361/681 |
| 5,276,589 | 1/1994 | Bartlett et al. | 361/681 |
| 5,285,938 | 2/1994 | Fauchald | 248/279.1 X |
| 5,494,447 | 2/1996 | Zaldan | 361/681 X |

OTHER PUBLICATIONS

Editor Opinion, *Pen Computing Magazine*, vol. 1, No. 1, pp. 5–6 (Aug. 1994).

"Pen Based Buyer's Guide", *Pen Computing Magazine*, vol. 1, No. 1, pp. 86–89 (Aug. 1994).

"PDA Buyer's Guide", *Pen Computing Magazine*, vol. 1, No. 1, pp. 83, 84 (Aug. 1994).

Advertisement for EHT–30 Handheld Computer, Seiko Epson Corporation (Oct. 1993).

Advertisement for IBM Think Pad 750 Family Notebook Computers (Sep. 1993).

*Primary Examiner*—Michael W. Phillips
*Attorney, Agent, or Firm*—Howard S. Robbins

[57] ABSTRACT

A device (10) adding keyboard input to a handheld computer (12) lacking such input (such as pen computers and personal digital assistants) includes a bracket (30) having a plurality of clips (33) removably carrying the handheld computer (12), and a joint (40) secured to the keyboard (11) and the bracket (30) for positioning the keyboard (11) in a plurality of orientations relative to the handheld computer (12). These orientations include a first orientation in which the keyboard (11) is operable and at a preselected viewing angle from a display (14) that is part of the handheld computer (12), a second orientation adjacent the display (14) in which the keyboard (11) substantially covers the display (14), and a third orientation proximate the handheld computer (12) in which the display (14) is unobstructed, thereby facilitating pen-based input through the display (14). A locking slide (51) carried in a recess (52) is selectively extended by the user to pass through a plurality of slots (53, 54 and 55) in joint (40) to secure the keyboard (11) and handheld computer (12) in the first and operational orientation.

20 Claims, 8 Drawing Sheets

SELECTIVELY ATTACHABLE KEYBOARD BRACKET AND LOCKABLE HOLDER FOR A HANDHELD COMPUTER

TECHNICAL FIELD

The present invention relates in general to processor based devices operable while being held in its user's hand, such as a handheld computer. More particularly, the present invention pertains to handheld computing devices lacking one or more type of input mechanism. More specifically, the present invention relates to handheld computing devices such as a handheld pen computer or personal digital assistant which omit a keyboard. Still more specifically, the present invention involves devices allowing a user of a keyboardless handheld computer to selectively attach a keyboard thereto and operate the keyboard while viewing the computer display at an angle to the plane of the keyboard.

BACKGROUND ART

Portable computing and communication devices are quickly becoming ubiquitous tools for both business and personal activities. The smallest and lightest of these devices are suitable for and most often carried and operated while being held in the hand of its user. Typical of these devices are the variety of so-called pen computers and personal digital assistants (PDAs) now commercially available. Whereas historically user input to computing and communication devices has been primarily through a keyboard, pen computers and PDAs have eliminated the keyboard, not only because its size and weight often make it inconvenient and impracticable to carry and use, but also because many mobile tasks require a more limited extent of textual input. As experience with these devices has increased, however, it has been recognized that from time to time nearly all applications and users would benefit from the ability to perform keyboard input.

Efforts have been made to provide both portable computers and pen computers in a single housing. These efforts have all involved repositioning the display of a laptop computer so that it covers and hides the keyboard, typically in the manner of a tablet. Exemplary of these efforts are the laptop computers shown in U.S. Pat. Nos. 5,276,589 and 5,268,816 in which the display is mounted to slide or pivot in three-dimensions over the keyboard; the laptop computer shown in U.S. Pat. No. 5,241,303 in which the display and keyboard detach and are repositioned with the display lying flat and the keyboard stored in a compartment under the display; and the ThinkPad Model 750P laptop computer manufactured by International Business Machines Corporation of White Plains, N.Y. in which the display is carried on an articulated arm which moves in three-dimensions to allow the display to be repositioned directly over the keyboard.

No matter what the approach, such efforts invariably produce units that are large, heavy, expensive, complex and difficult and cumbersome to transform from keyboard input to keyboardless operation. Moreover, these efforts do not adapt to pen computers and PDAs currently in use, and are not suitable for operation while being carried in the hand of a user in motion.

Some pen computers and PDAs presently commercially available do include a socket to connect to the cable from a conventional keyboard. However, given the inconvenience of carrying, connecting and operating a completely external keyboard, existing pen computer and PDA users almost universally elect to go without keyboard input even in those relative frequently occurring situations in which it would be beneficial. In those situations where a keyboard is cabled to a pen computer or PDA, the user is forced to either position the pen computer or PDA display in the same plane as the keyboard, causing significant input viewing difficulties and stress, or seek another object with which to prop up the pen computer or PDA display, at best an unstable, make-shift configuration subject to collapse.

In short, heretofore no handheld computer possessed an orientation facilitating keyboard-based input when the device is simultaneously handheld and mobile, another orientation facilitating pen-based input when the device is simultaneously handheld and mobile, and a nonoperational orientation.

SUMMARY OF THE INVENTION

It is, therefore, an object of the present invention to provide a device that furnishes a handheld computer with an orientation facilitating keyboard-based input when the handheld computer is operated simultaneously handheld and mobile, another orientation facilitating pen-based input when the handheld computer is operated simultaneously handheld and mobile, and a nonoperational orientation.

It is another object of the present invention to provide a device, as set forth above, that permits the inclusion of a keyboard with a keyboardless handheld computer.

It is still another object of the present invention to provide a device, as set forth above, which is simple to move from an operational to a nonoperational position.

It is yet another object of the present invention to provide a device, as set forth above, that is as compact as the handheld computer, inexpensive to manufacture and uncomplicated.

It is a further object of the present invention to provide a device, as set forth above, that may be removably added by the user to existing and new handheld computers.

It is still a further object of the present invention to provide a device, as set forth above, that allows the user to position the keyboard at an angle to the computer display, facilitating comfortable viewing during keyboard input.

It is yet a further object of the present invention to provide a device, as set forth above, that allows the user to lockable secure the keyboard and the computer at the aforesaid viewing angle and insures the device does not collapse or tip over when so secured.

These and other objects and advantages of the present invention over existing prior art forms will become more apparent and fully understood from the following description in conjunction with the accompanying drawings.

In general, a device in accordance with the present invention selectively attaches a keyboard to a handheld apparatus having a display, and includes a bracket for removably carrying the handheld apparatus, the bracket releasably securable to the handheld apparatus at a plurality of locations the bracket having at least two engaging elements forming an open slot receiving the handheld apparatus and a joint securable to the keyboard and the bracket for positioning the keyboard in a plurality of orientations relative to the display. These orientations include a first orientation in which the keyboard is operable and at a preselected viewing angle from the display, a second orientation adjacent the display in which the keyboard substantially covers the display, and a third orientation proximate the handheld apparatus in which the display is unobstructed.

In general, another device in accordance with the present invention includes a handheld apparatus having a display, a first input to the handheld apparatus, at least two engaging elements forming an open sided slot receiving the handheld apparatus and a joint secured to the engaging elements and to the first input for positioning the first input in a plurality of orientations relative to the display. These orientations including a first orientation in which the first input is operable and at a preselected viewing angle from the display, a second orientation adjacent the display in which the first input substantially covers the display, and a third orientation proximate the handheld apparatus in which the display is unobstructed.

PREFERRED EMBODIMENT FOR CARRYING OUT THE INVENTION

Figure 10:
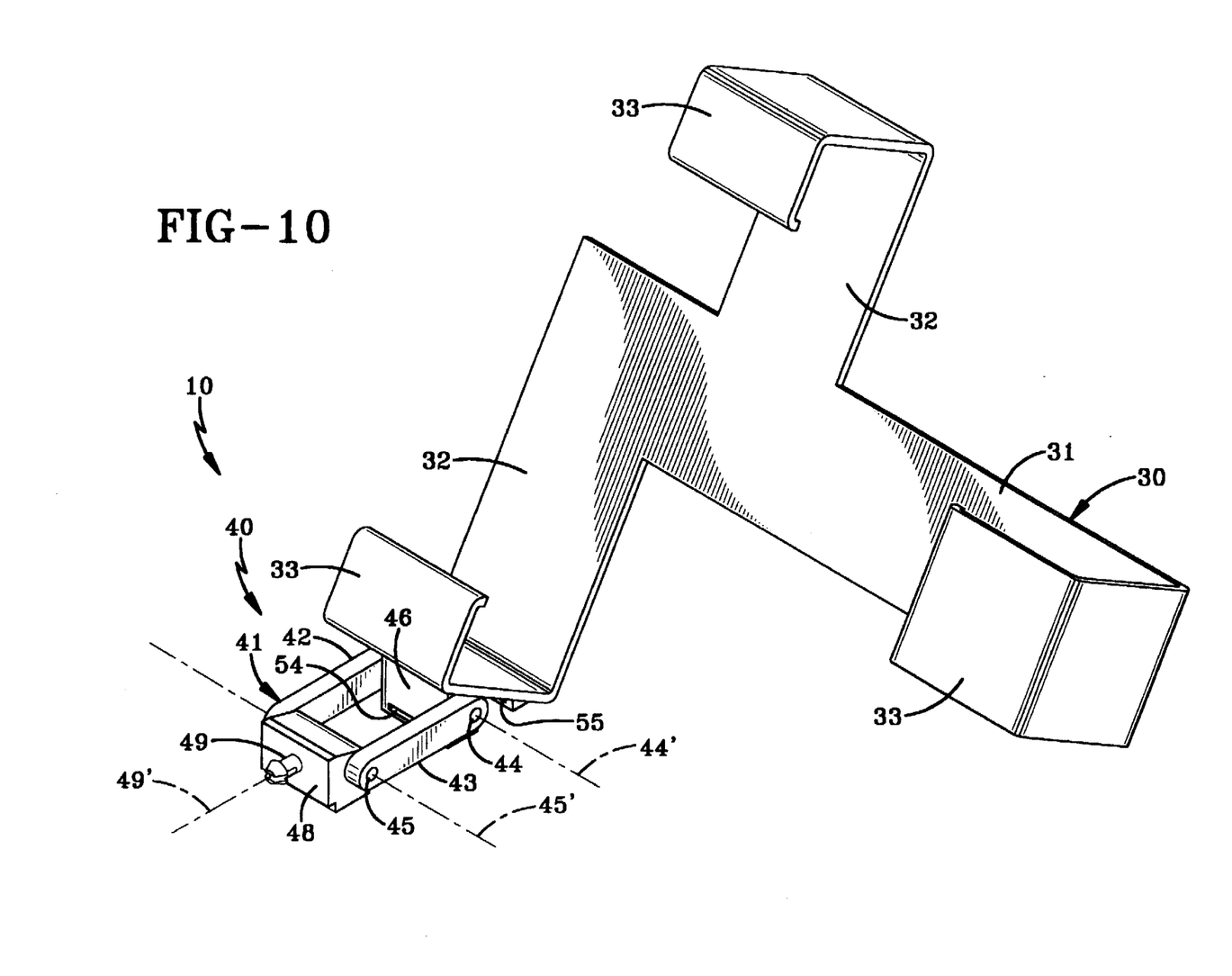
FIG. 10 is a perspective view of the exemplary device shown in FIG. 1.

FIG. 10 presents a perspective view of an exemplary device in accordance with the present invention, generally indicated by the numeral 10, for providing a keyboard input apparatus 11 to a handheld computer 12 or other apparatus, such as a pen computer or a personal digital assistant (PDA).

Figure 1:
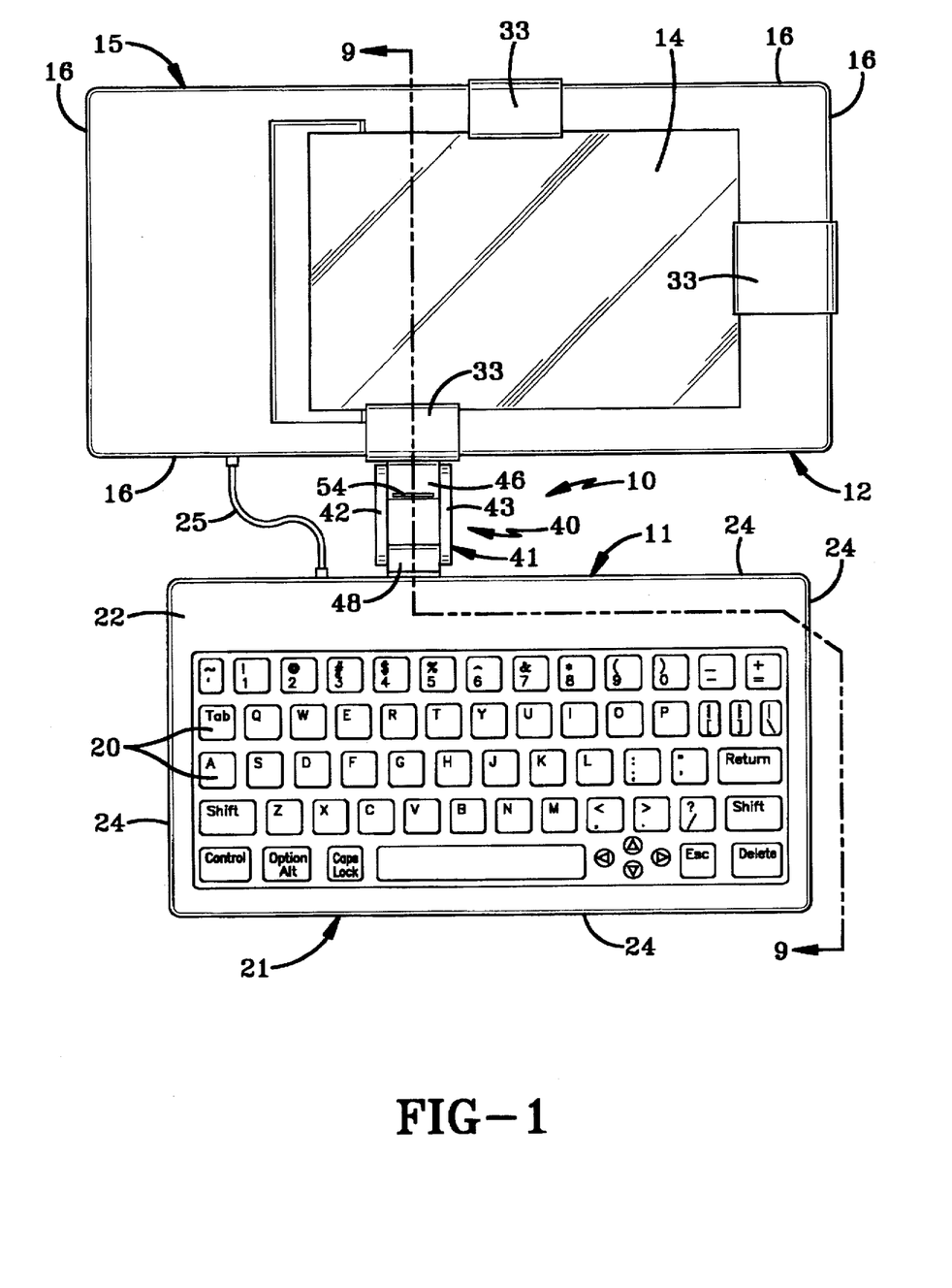
FIG. 1 is a top plan view of an exemplary device in accordance with the present invention in an operational orientation, depicting a selectively attachable keyboard socket clipped to a handheld computer and carrying a keyboard.
Figure 2:
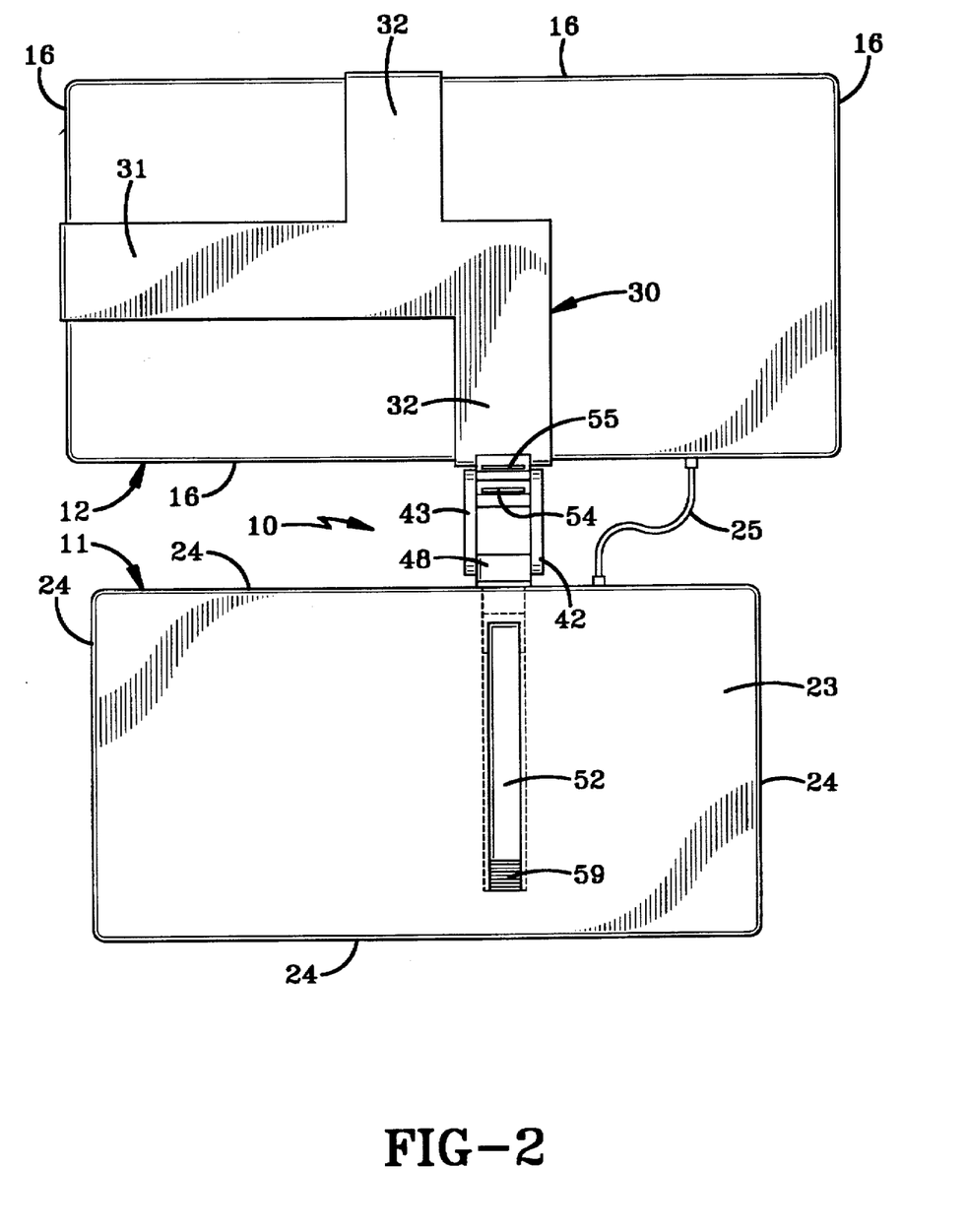
FIG. 2 is a bottom plan view of the exemplary device shown in FIG. 1 in the same orientation as depicted in FIG. 1.

Handheld computer 12 includes a display 14 carried within a housing 15 possessing a plurality of sides 16, best seen in the top and bottom plan views of FIGS. 1 and 2, respectively. Device 10 broadly includes a bracket 30 for removably carrying a handheld computer 12 as further detailed hereinafter, a joint 40 for allowing the relative positioning and orientation described below between handheld computer 12 and keyboard input apparatus 11 secured thereto, and a locking mechanism 50 for fixing an angular relationship between keyboard input apparatus 11 and handheld computer 12 (and, more specifically, its display 14).

Keyboard input apparatus 11 (hereinafter keyboard 11) secured to device 10 includes a plurality of keys 20 carried within a keyboard housing 21 having a front 22 through which the keys extend, a back 23, and four sides 24. A cable 25 including multiple electrical power and data conductors extends between and electrically interconnects keyboard 11 and handheld computer 12. Keyboard 11 is preferably no larger in area than that of handheld computer 12 and is as thin and light as possible. Nevertheless, the skilled artisan will appreciate the desirability of employing a keyboard 11 with an acceptable balance of size, weight and tactile operating characteristics.

Bracket 30 removably carries handheld computer 12, and includes a beam 31 from which extend a plurality of arms 32. The distal end of each arm 32 is formed, preferably integrally, into a clip 33 for releasably securing bracket 30 to handheld computer 12 at a plurality of locations by releasably grasping a suitable plurality of the sides 16 of handheld computer 12. Beam 31, arms 32 and clips 33 are preferably positioned so as to engage sides 16 at locations that do not interfere with access to controls and electrical connections extending through housing 15.

Joint 40 includes a parallel linkage 41 having two swing arms 42, 43 rotatable about a pivot pin 44 with longitudinal axis 44' at one end of parallel linkage 41, and a pivot pin 45 with longitudinal axis 45' at the opposite end of parallel linkage 41. Joint 40 further includes a substantially rectangular block-shaped bracket anchor 46 fixed to and preferably integrally formed with bracket 30, and a substantially rectangular block-shaped keyboard anchor 48. Bracket anchor 46 spaces apart swing arms 42, 43 at the end of parallel linkage 41 that adjoins bracket 30 and rotates about pivot pin 44. Keyboard anchor 48 spaces apart swing arms 42, 43 at the end of parallel linkage 41 that adjoins keyboard 11 and rotates about pivot pin 45. The skilled artisan will appreciate that configured in this manner joint 40 allows any object affixed to the side of keyboard anchor 48 furthest from bracket 30 to be swung both in front of bracket 30 and behind bracket 30.

Figure 9:
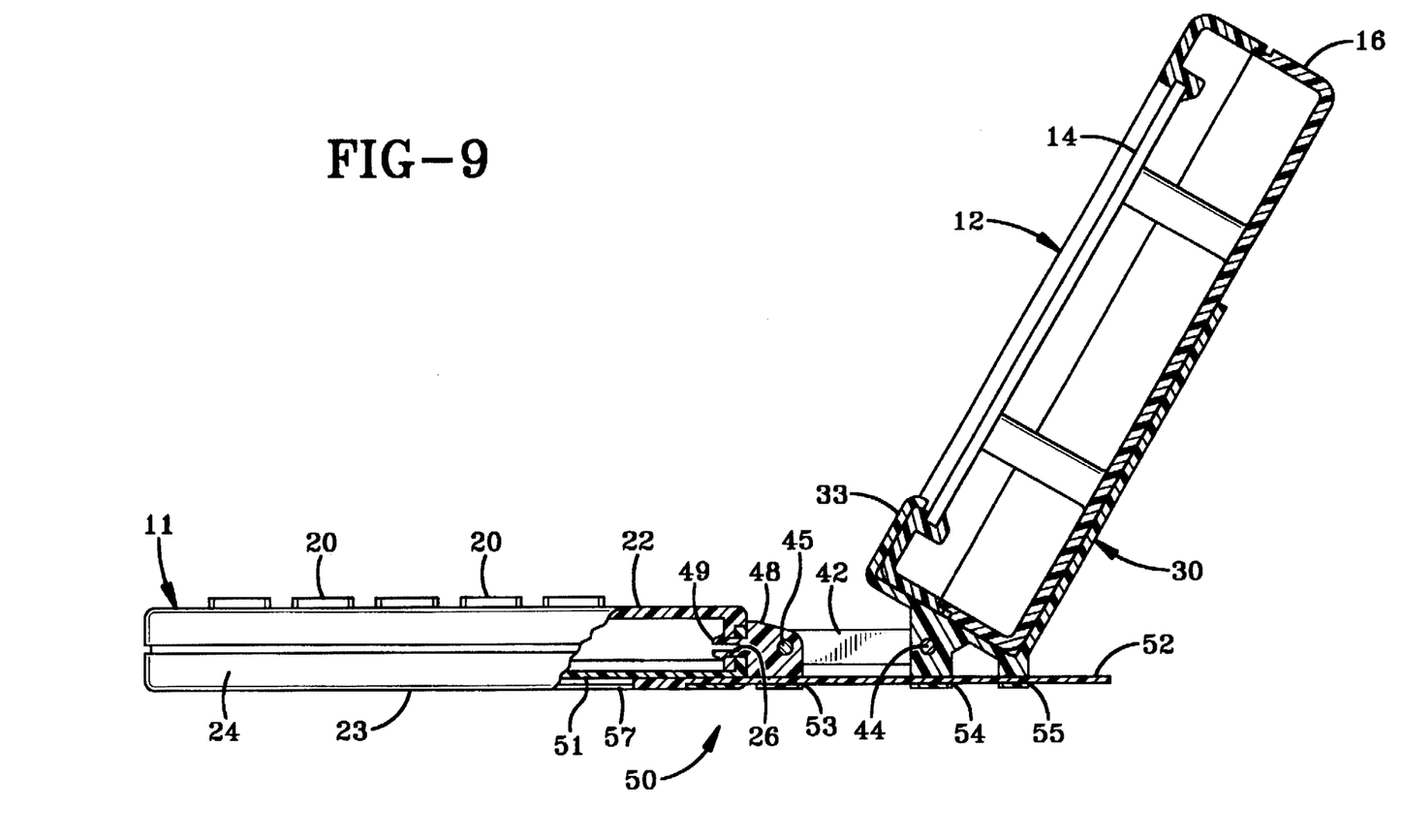
FIG. 9 is a side elevation as shown in FIG. 7 in which a portion of the keyboard, the exemplary device, and a portion of the handheld computer are all illustrated in partial sectional form taken substantially along the line 9—9 of FIG. 1, presenting the display support mechanism in its locked, operational orientation.

Keyboard anchor 48 includes a mechanism for securing keyboard 11 thereto in such manner as to allow its rotation about an axis perpendicular to axes 44' and 45', such as split anchor pin 49 having longitudinal axis 49'. Split anchor pin 49 is substantially cylindrically-shaped with a mushroom head to engage a mating bore 26 (FIG. 9) in the rear side of keyboard 11, allowing rotation of keyboard 11 about axis 49'.

Figure 5:
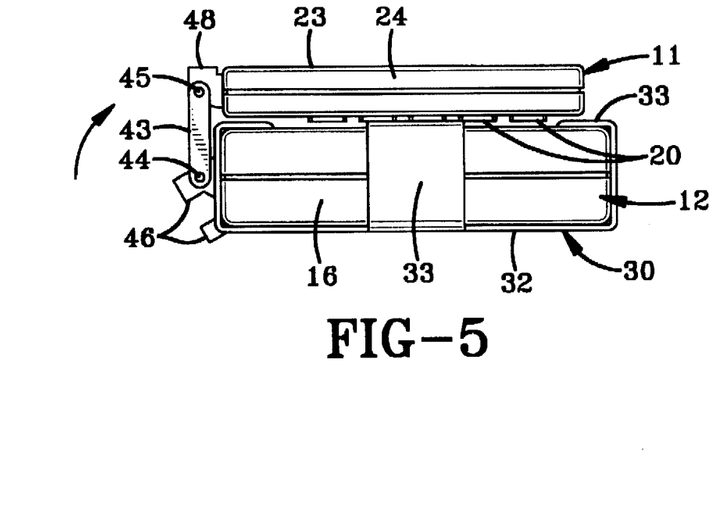
FIG. 5 is a side elevation of the exemplary device shown in FIG. 1 in a closed orientation in which the keyboard is folded over the handheld computer display with the keyboard keys facing the display.
Figure 7:
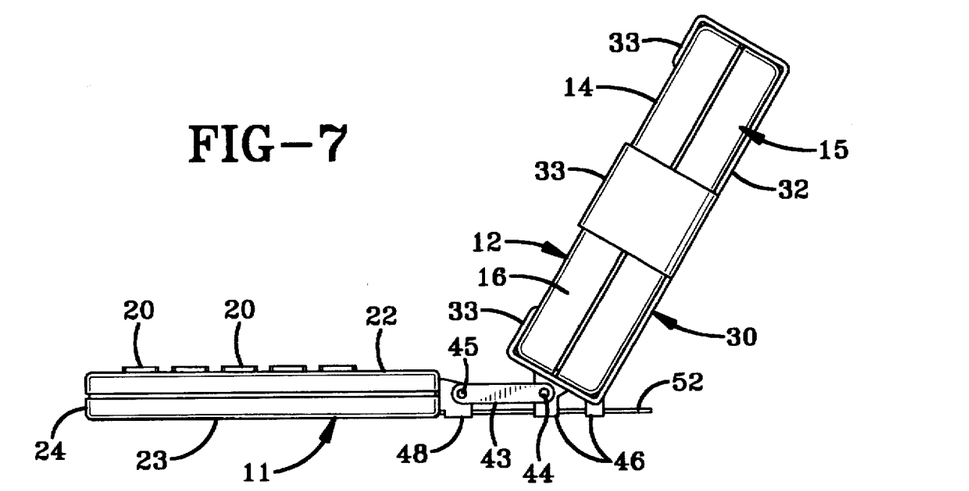
FIG. 7 is a side elevation of the exemplary device shown in FIG. 1 in a keyboard-based data entry orientation in which the keyboard is positioned at a preselected viewing angle relative to the handheld computer display, similar to that of a small notebook-style computer, enabling both keyboard-based and pen-based data entry.
Figure 8:
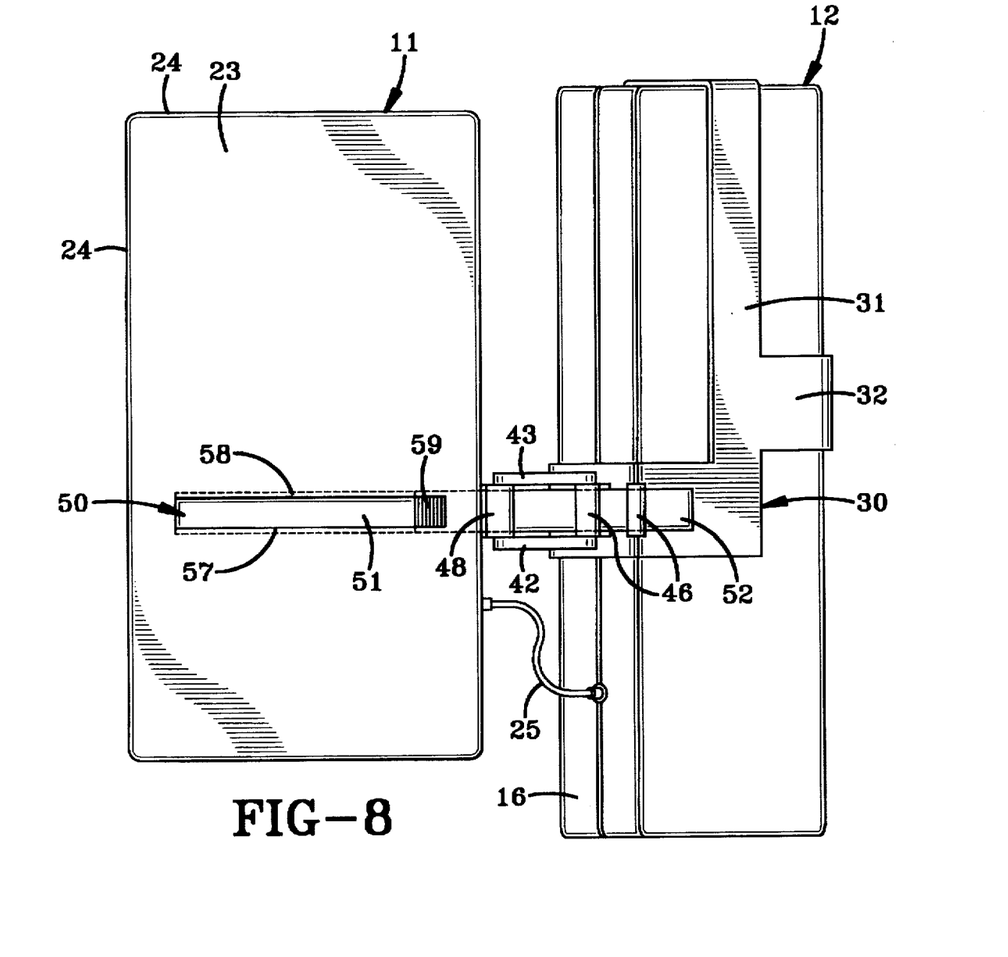
FIG. 8 is a bottom plan view of the exemplary device shown in FIG. 1 in the keyboard-based data entry orientation depicted in FIG. 7.
Figure 11:
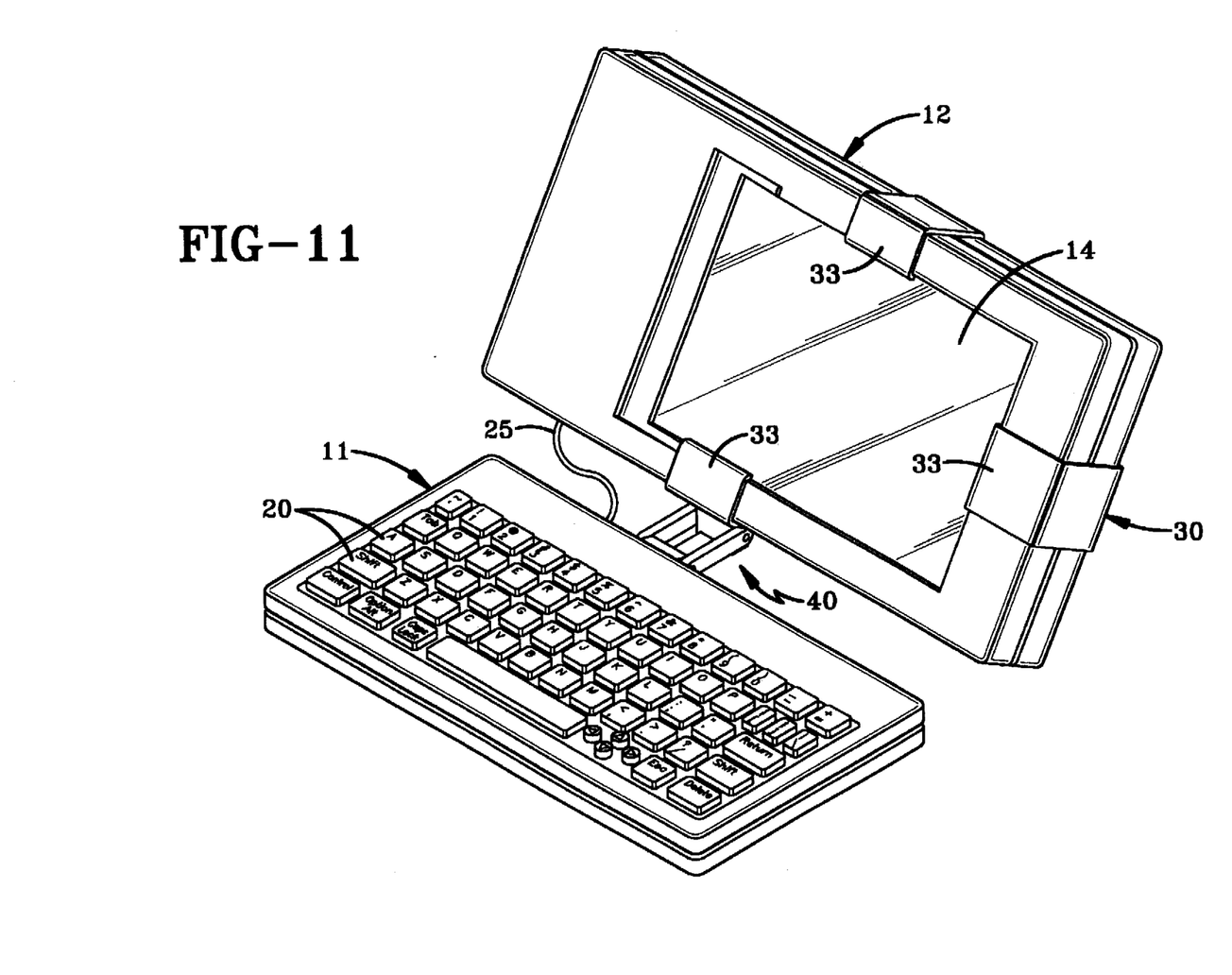
FIG. 11 is a perspective view of the exemplary device shown in FIG. 1 in the orientation depicted in FIGS. 7 and 9.

Joint 40 permits and facilitates a plurality of relative positions between keyboard 11 and device 10, and more particularly display 14. In what may be arbitrarily referred to as a first and operational orientation, best depicted in the perspective view of device 10 in FIG. 11, the side and bottom views of FIGS. 7 and 8, respectively, and the partial side view/partial sectional view of FIG. 9 taken substantially along the line 9—9 of FIG. 1, keyboard 11 is operable and at a comfortable, preselected viewing angle from display 14, much like that of a notebook computer. In what may be arbitrarily referred to as a second orientation, keyboard 11 substantially covers display 14, preferably with keys 20 facing display 14, as illustrated in FIG. 5, to preclude their inadvertent engagement. In what may be arbitrarily referred to as a third and operational orientation, keyboard 11 is positioned adjacent the back 23 of handheld apparatus 12, preferably with keys 20 facing back 23, as shown in FIG. 6, to preclude their inadvertent engagement.

Figure 4:
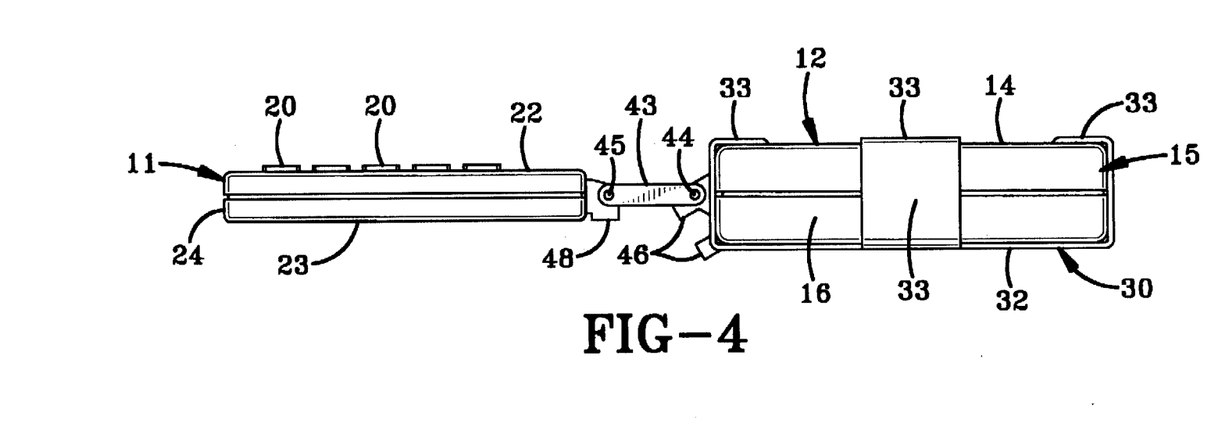
FIG. 4 is a side elevation of the exemplary device shown in FIG. 1 in the same orientation depicted in FIG. 1.

Changing the relative positioning and orientation between keyboard 11, on the one hand, and handheld computer 12 and its display 14, on the other hand, involves straightforward motion of joint 40 that may be explained beginning with keyboard 11 and handheld computer 12 in substantially the same plane, as depicted in the side elevation of FIG. 4 and the top and bottom plan views of FIGS. 1 and 2, respectively. The first and operational orientation is achieved by simply rotating bracket 30 about pivot pin 44 and its longitudinal axis 44' in the direction that brings display 14 closer to keys 20, as presented in the perspective view of FIG. 11, the side elevations of FIG. 7 and 9, and the bottom plan view of FIG. 8.

The second orientation may be realized from the planar position of FIG. 4 by rotating bracket 30 about both pivot pins 44 and 45 and their respective longitudinal axes 44' and 45' in the direction that folds keyboard 11 over display 14, as shown in FIG. 5, preferably with keys 20 facing display 14 so that keyboard 11 may act as a protective cover thereto in this nonoperational configuration.

Figure 3:
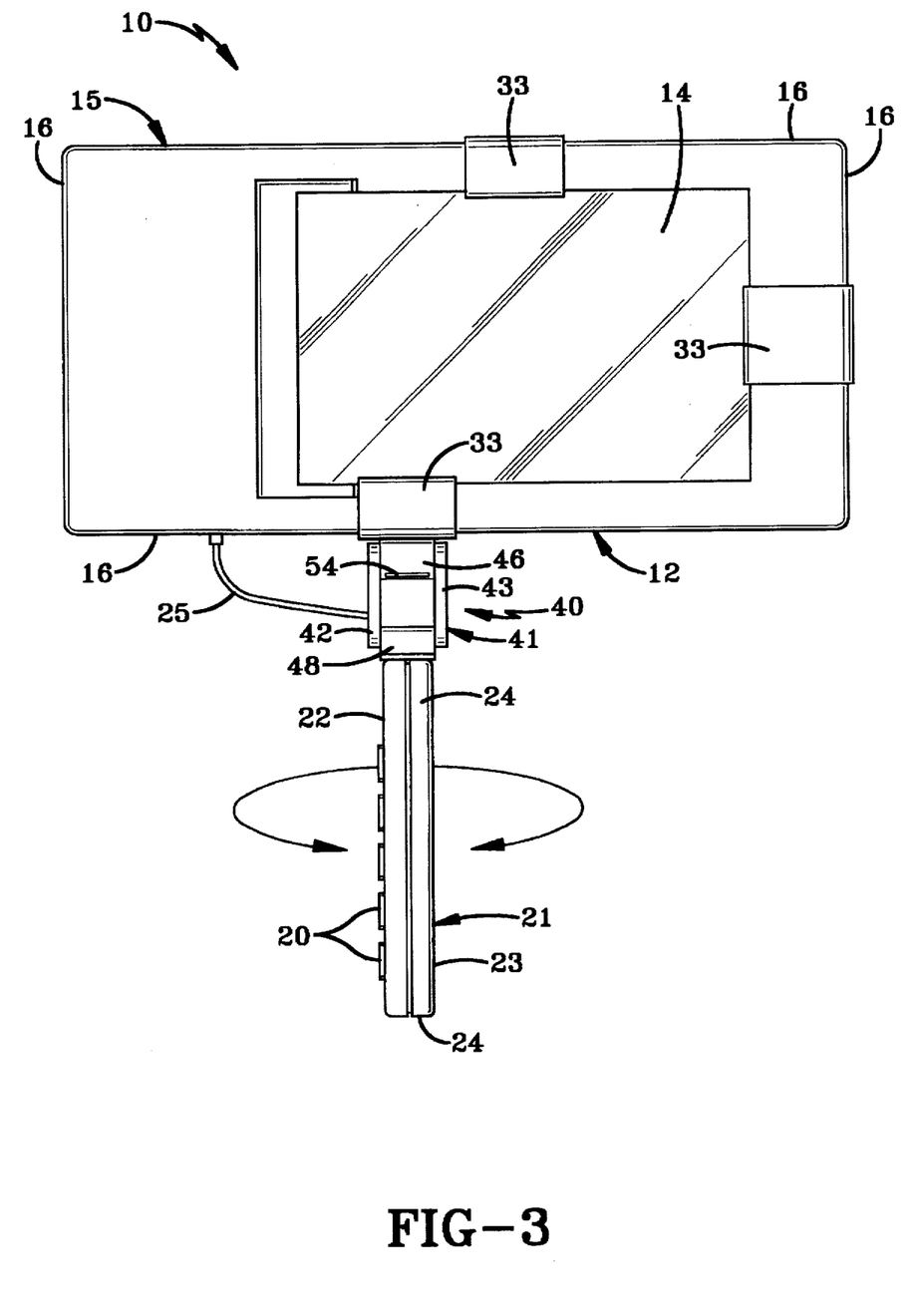
FIG. 3 is a top plan view of the exemplary device shown in FIG. 1 in which the keyboard has been rotated about its top-to-bottom axis 90° from the plane of the handheld computer.
Figure 6:
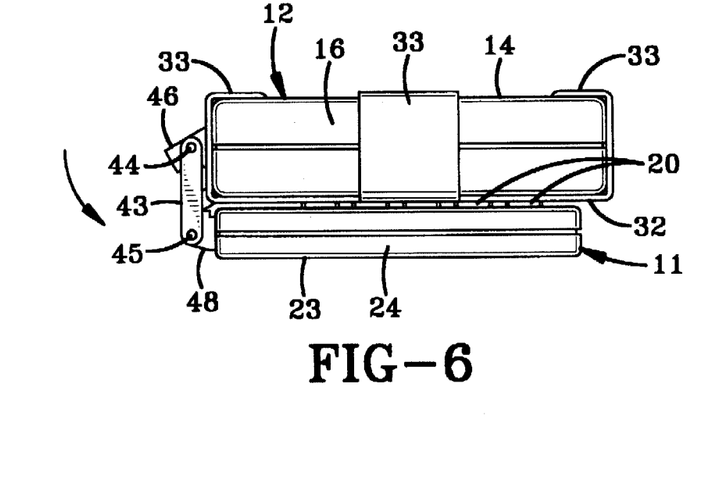
FIG. 6 is a side elevation of the exemplary device shown in FIG. 1 in a pen-based data entry orientation in which the keyboard is folded behind the back of the handheld computer with the keyboard keys facing the back of the handheld computer.

The third orientation may be reached from the planar position of FIG. 4 by first twisting keyboard 11 (as simulated in FIG. 3) one hundred eighty degrees about anchor pin 49 until keys 20 are facing downward, and then rotating bracket 30 about both pivot pins 44 and 45 and their respective longitudinal axes 44' and 45' in the direction that folds keyboard 11 behind handheld computer 12, as shown in FIG. 6. In this pen-based entry operational configuration keyboard 11 is folded behind back 23 so as to permit complete and unobstructed access to display 14, and prevent the inadvertent pressing of keys 20.

Locking mechanism 50, which maintains display 14 in the preselected viewing orientation with respect to keyboard 11, includes a locking slide 51 slidably carried in a recess 52 in the back 23 of keyboard housing 21, and a plurality of slots 53, 54 and 55 through which locking slide 51 may be selectively slidably inserted and removed, as collectively illustrated in FIGS. 2 and 7 through 10. Recess 52 is preferably integrally formed into the rear of keyboard housing 14, is substantially rectangular to correspond in geometry to locking slide 51, and has two guide rails 57, 58 disposed along either edge of recess 52 to engage long edges of locking slide 51 and let locking slide 51 slide therealong. Recess 52 is positioned such that as locking slide 51 is pushed toward handheld computer 12 as by a user's finger applied to a raised finger pad 59 formed at the end of locking slide 51 most distant from handheld computer 12, locking slide 51 enters and passes through slot 53 in keyboard anchor 48, and slots 54 and 55 in the front and rear, respectively, of bracket anchor 46 until at its furthest extended position, shown in FIGS. 7 through 9, locking slide 51 extends slightly past the rear of bracket anchor 46. When fully withdrawn into recess 52, as best seen in FIG. 2, locking slide 51 is carried entirely within keyboard housing 21.

It should now be apparent that once the user has placed keyboard 11 and handheld computer 12 in the first and operational orientation, the user pushes locking slide 51 to its furthest extended position, precluding both rotation of keyboard 11 about keyboard anchor pin 49 and movement of joint 40. Conversely, when the user wishes to configure keyboard 11 and handheld computer 12 in its nonoperational second orientation or pen-based input third orientation, locking slide 51 is first fully retracted into keyboard housing 21. Further, whenever keyboard 11 is positioned atop a planar surface as a palmtop or desktop, the end of locking slide 51 extending past the rear of bracket anchor 46 functions as a retractable fulcrum acting against the planar surface, precluding tipping due to the greater weight of the elevated handheld computer 12.

Other modifications within the spirit of the present invention now should be evident to the skilled artisan. For example, for additional support of handheld computer 12, a selectively collapsible leg (not shown) may be included in the rear of bracket 30. Also, the present invention may be employed with any input device omitted from the handheld computer.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of adding omitted functionality to handheld computing devices and, more particularly, adding keyboards to pen computers and PDAs.

We claim:

1. A device for selectively attaching a keyboard to a handheld apparatus having a display, comprising:
   a bracket for removably carrying the handheld apparatus, said bracket releasably securable to the handheld apparatus at a plurality of locations and having at least two engaging elements forming an open sided slot to receive the handheld apparatus; and,
   a joint securable to the keyboard and said bracket for positioning the keyboard in a plurality of orientations relative to the display including a first orientation in which the keyboard is operable and at a preselected viewing angle from the display, a second orientation adjacent the display in which the keyboard substantially covers the display, and a third orientation proximate the handheld apparatus in which the display is unobstructed.

2. A device, as set forth in claim 1, wherein said joint includes a parallel linkage defined by two swing arms each having two opposing ends, said swing arms rotatable about a pivot pin at both ends of said swing arms, said swing arms spaced apart at one end by a first anchor freed to said bracket and spaced apart at the opposite end by a second anchor pivotally securable to the keyboard.

3. A device, as set forth in claim 2, wherein said second anchor has a longitudinal axis about which it rotates and is coaxial with one of said pivot pins, and said second anchor includes an anchor pin extending perpendicular from said longitudinal axis of said second anchor, the keyboard rotatable about said anchor pin.

4. A device, as set forth in claim 3, further including a locking mechanism whereby the keyboard and display are fixedly securable in said first orientation.

5. A device, as set forth in claim 4, wherein said locking mechanism includes a first slot in said first anchor and a second slot in said second anchor in substantial alignment with said first slot when the keyboard and the display are in said first orientation, and a locking slide selectively extendable through said first slot and said second slot.

6. A device, as set forth in claim 5, wherein said locking slide is selectively extendable into and retractable from said first slot and said second slot when the keyboard and the display are in said first orientation.

7. A device, as set forth in claim 5, wherein said locking slide is selectively extendable beyond said second anchor thereby effecting a retractable fulcrum.

8. A device, as set forth in claim 1, wherein said engaging elements include clips for releasably grasping the handheld apparatus at locations noninterfering with operational features of the handheld apparatus.

9. A device comprising: a handheld apparatus having a display; a first input to said handheld apparatus; at least two engaging elements forming an open sided slot receiving the handheld apparatus; and, a joint secured to said engaging elements and to said first input for positioning said first input in a plurality of orientations relative to said display including a first orientation in which said first input is operable and at a preselected viewing angle from said display, a second orientation adjacent said display in which said first input substantially covers said display, and a third orientation proximate said handheld apparatus in which said display is unobstructed.

10. A device, as set forth in claim 9, wherein said first input is a keyboard.

11. A device, as set forth in claim 10, wherein said joint includes a parallel linkage defined by two swing arms each having two opposing ends, said swing arms rotatable about a pivot pin at both ends of said swing arms, said swing arms spaced apart at one end by a first anchor fixed to said handheld apparatus and spaced apart at the opposite end by a second anchor pivotally secured to said keyboard.

12. A device, as set forth in claim 11, wherein said second anchor has a longitudinal axis about which it rotates and is coaxial with one of said pivot pins, and said second anchor includes an anchor pin extending perpendicular from said longitudinal axis of said second anchor, said keyboard rotatable about said anchor pin.

13. A device, as set forth in claim 12, further including a locking mechanism whereby said keyboard and said display are fixedly secured in said first orientation.

14. A device, as set forth in claim 13, wherein said locking mechanism includes a first slot in said first anchor and a second slot in said second anchor in substantial alignment with said first slot when said keyboard and said display are in said first orientation, and a locking slide selectively extendable through said first slot and said second slot.

15. A device, as set forth in claim 14, wherein said keyboard has a housing with a front and a back and a plurality of keys extend from said housing front, and wherein said locking slide is seated between two guide rails in said housing back for selective extension into and retraction from said first slot and said second slot when said keyboard and said display are in said first orientation.

16. A device, as set forth in claim 14, wherein said locking slide is selectively extendable beyond said second anchor thereby effecting a retractable fulcrum.

17. A device, as set forth in claim 9, wherein said handheld apparatus is one of a pen computer and personal digital assistant.

18. A device comprising:

a handheld apparatus having a display:

a keyboard for input to said handheld apparatus;

a joint secured, to said handhold apparatus and to said keyboard for positioning said keyboard in a plurality of orientations relative to said display including a first orientation in which said keyboard is operable and at a preselected viewing angle from said display, a sectional orientation adjacent said display in which said keyboard substantially covers said display, and a third orientation proximate said handheld apparatus in which said display is unobstructed, said joint including a parallel linkage defined by two swing arms each having two opposing ends, said swing arms rotatable about a pivot pin at both ends of said swing arms, said swing arms spaced apart at one end by a fast anchor fixed to said handheld apparatus and spaced apart at the opposite end by a second anchor pivotally secured to said keyboard.

said second anchor having a longitudinal axis about which it rotates and is coaxial with one of said pivot pins, said second anchor including art, anchor pin extending perpendicular from said longitudinal axis of said second anchor, said keyboard rotatable about said anchor pin; and a locking mechanism whereby said keyboard and said display are fixedly securable in said first orientation, said locking mechanism including a first slot in said first anchor and a second slot in said second anchor in substantial alignment with, said first slot when, said keyboard and said display, are, in said first orientation, and a locking slide selectively extendable through said first slot and said second slot.

19. A device, as set forth in claim 18, wherein said keyboard has a housing with a front and a back and a plurality of keys extend from said housing front, and wherein said locking slide is seated between two guide rails in said housing back for selective extension into and retraction from said first slot and said second slot when said keyboard and said display are in said first orientation.

20. A device, as set forth in claim 18, wherein said locking slide is selectively extendable beyond said second anchor thereby effecting a retractable fulcrum.

\* \* \* \* \*